United States Patent Office

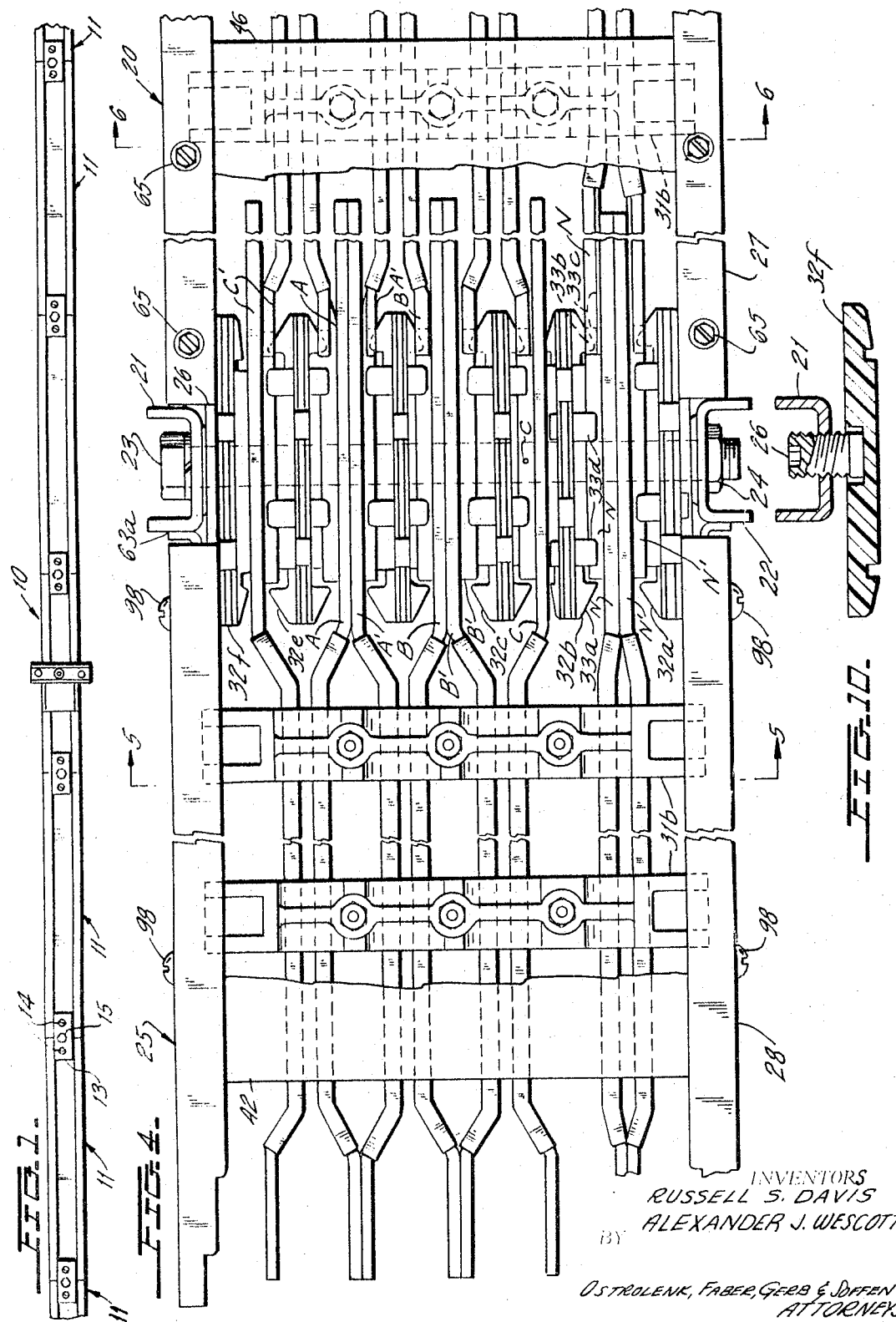

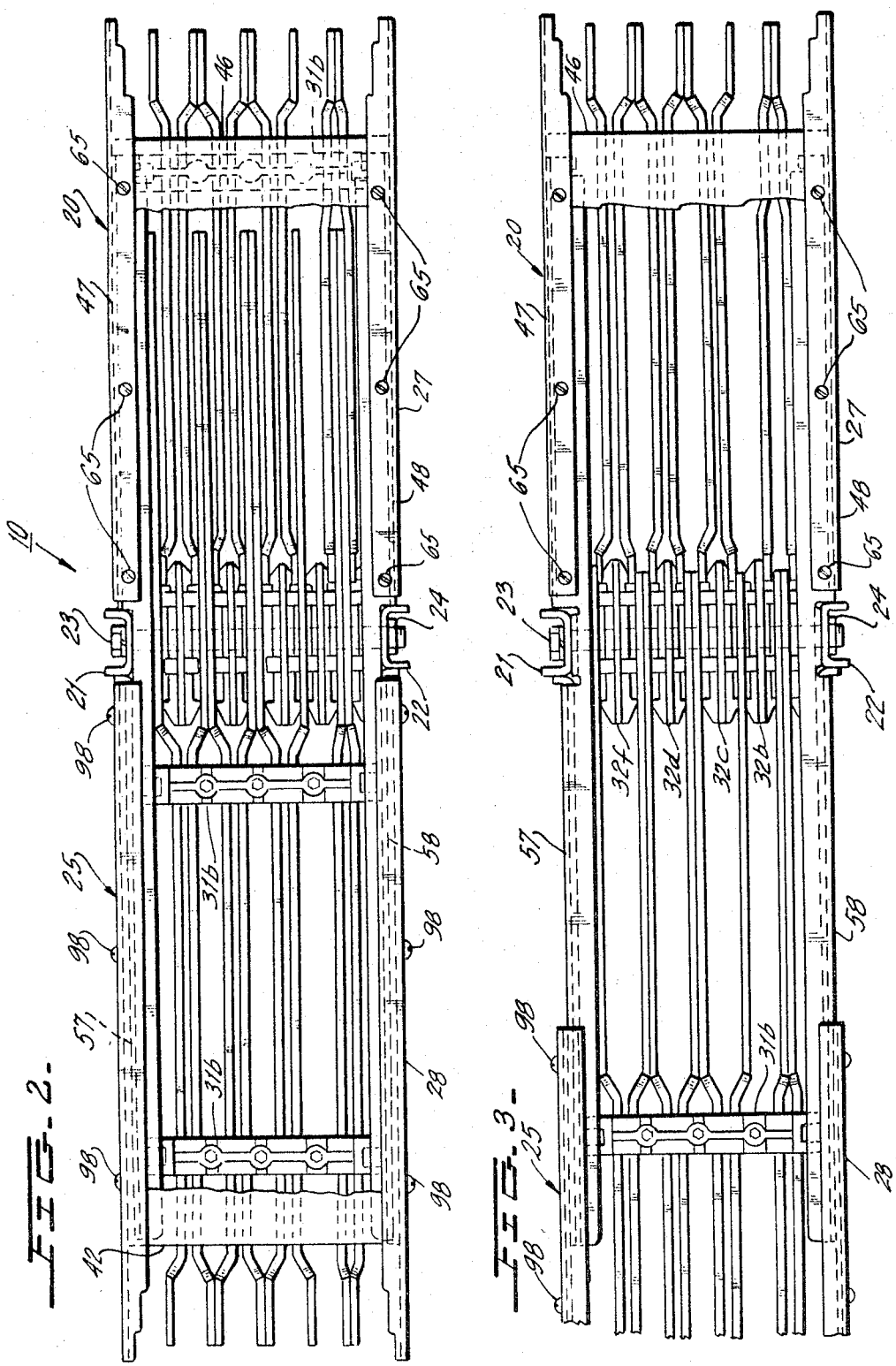

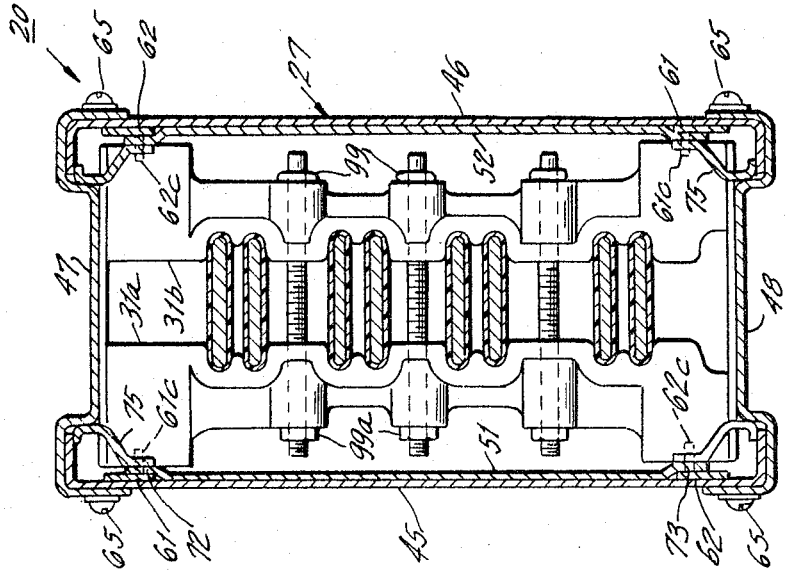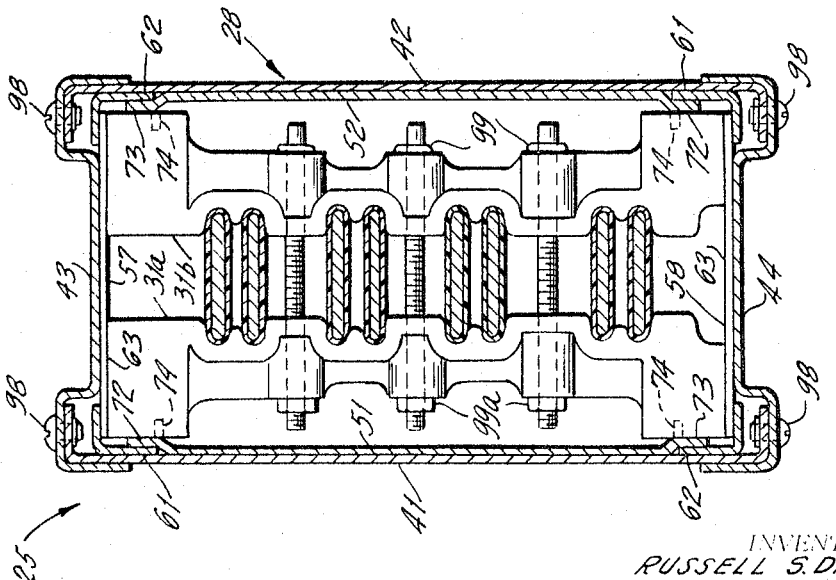

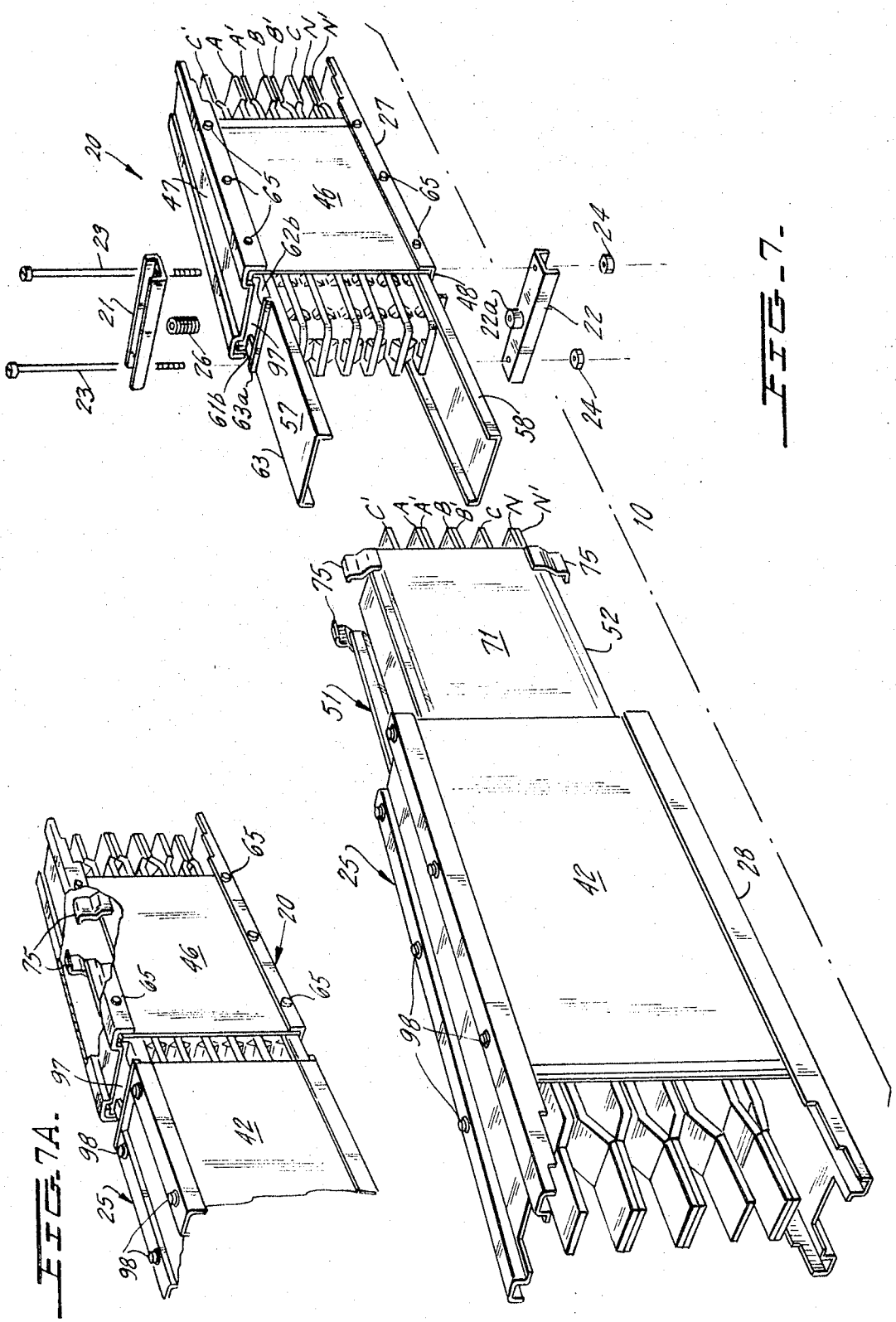

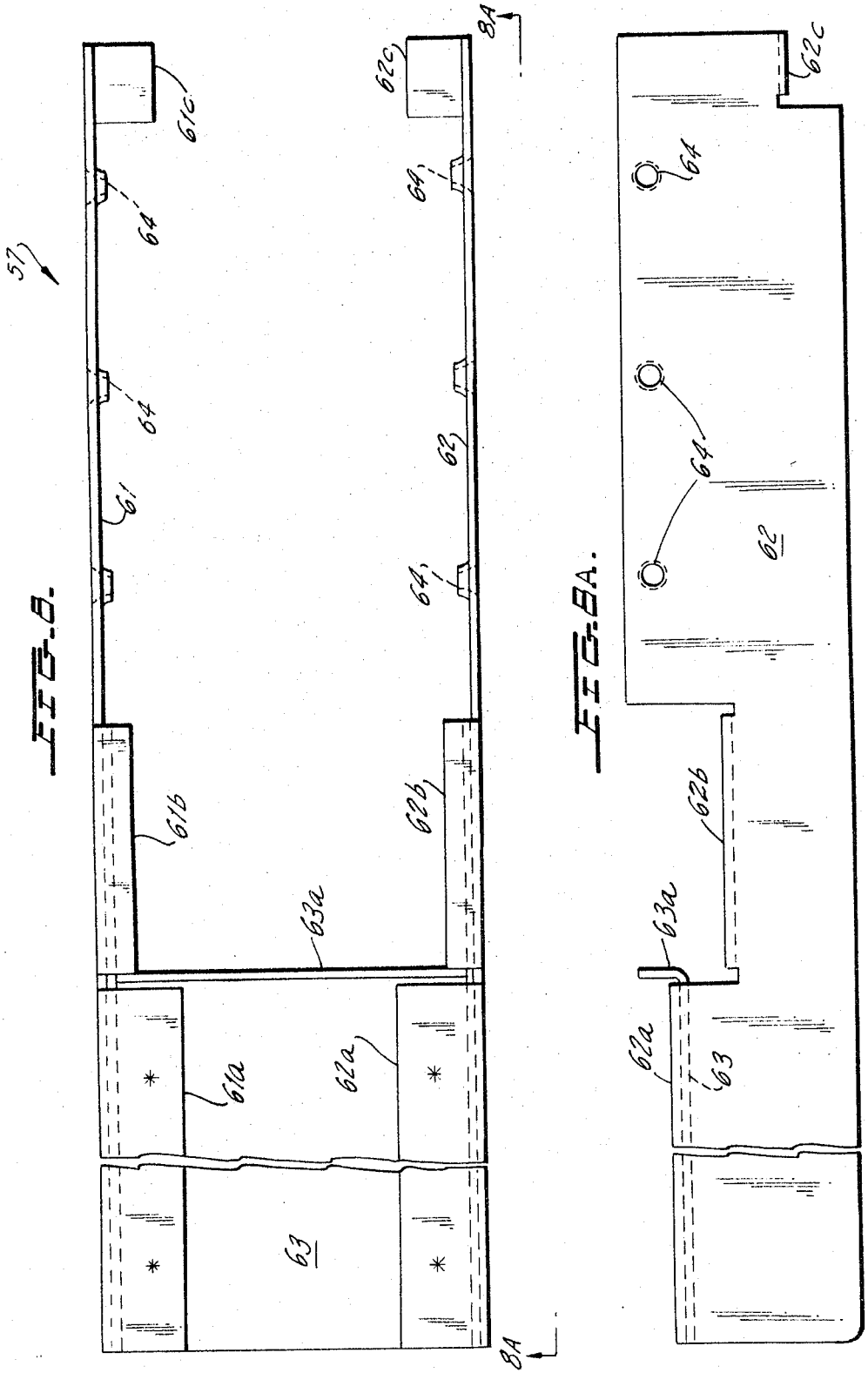

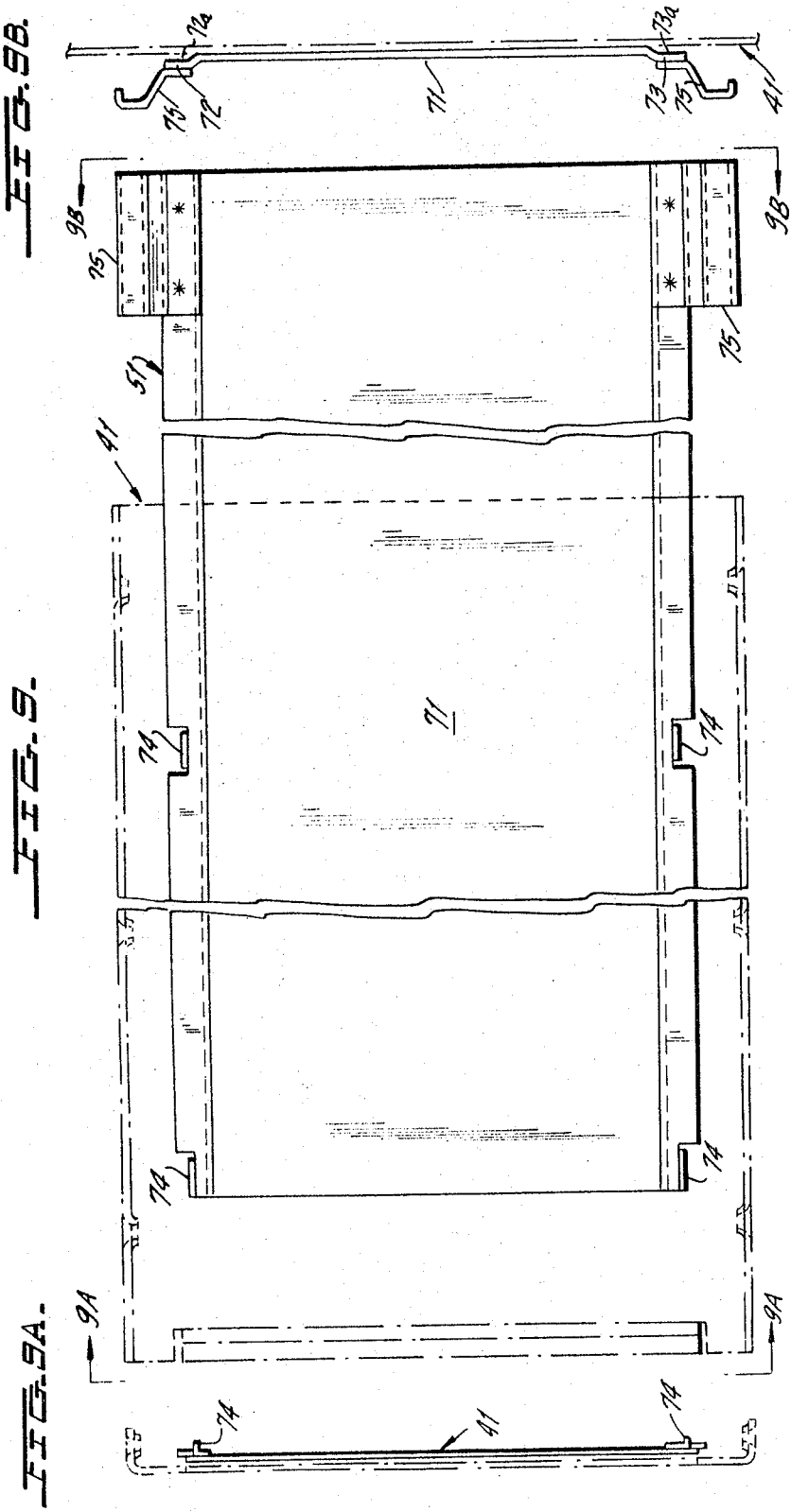

3,462,541
Patented Aug. 19, 1969

3,462,541
ADJUSTABLE LENGTH STRAIGHT SECTION
FOR BUS DUCT
Russell S. Davis, Detroit, and Alexander J. Wescott,
Grosse Pointe, Mich., assignors, by mesne assignments,
to I-T-E Imperial Corporation, Philadelphia, Pa., a corporation of Delaware
Filed Aug. 3, 1967, Ser. No. 658,210
Int. Cl. H02g 5/04
U.S. Cl. 174—88                         10 Claims

ABSTRACT OF THE DISCLOSURE

In order to facilitate installation of a bus duct run an adjustable length duct section is provided by utilizing telescoping housing portions with bus bars in sliding engagement. Pressure for good electrical contact between engaged bus bars is provided by a clamping collar so that clamping forces are not transmitted to either housing portion. The bus bars of the adjustable section are arranged in a so-called pair phase low impedance configuration.

---

This invention relates to electric distribution systems are more particularly to a bus duct construction with a novel adjustable length unit section of duct.

Distribution of electric power within industrial buildings is often accomplished by bus duct systems. Such systems include one or more runs each consisting of a plurality of bus duct units connected end to end. These units are factory constructed in standard lengths with the connections between units being made in the field.

Unfortunately, the required length of a bus duct run is often not an integral number of standard length duct units. Accordingly, a unit of special length is required. Field modification of a standard length unit to the required special length is time consuming and is often impractical or even impossible. Such special length unit when custom made at the factory is very expensive and this expense is often enlarged by errors made in measuring building dimensions.

Another approach to special length units is to provide a unit having means for adjustment of length in the field. It is this latter type of construction to which the instant application is directed.

Prior art adjustable length bus duct units are exemplified by the Busway System disclosed in U.S. Patent 3,031,521 issued Apr. 24, 1962 to P. Krauss et al. The construction illustrated in the aforesaid Krauss et al. patent includes many features typical of prior art devices of this type. That is, the Krauss et al. construction requires substantial modification of the bus bars in the adjusting region, external clamp means are required to achieve mechanical stability and extraordinary measures are resorted to achieve a so-called dead front appearance.

The device of the instant invention provides an improvement of the prior art by including a paired phase adjustable length bus duct unit having identical housing sections connected end to end by an intermediate connecting means consisting of portions connected to the first housing and extending into the second housing and other portions connected to the second housing and extending into the first housing. The bus bars within the housing sections are of substantially uniform shape throughout the length thereof with electrical contact being made by intimate engagement between external bus bar surfaces. The bus bars throughout the major portion of the lengths thereof are arranged in a ladder type low impedance configuration. However, in the region of the connecting means, the bus bars are offset in appropriate directions to minimize the number of insulating members required at the sliding joint and to facilitate positioning of these insulators.

The connecting means is provided with apertures closed by frame means surrounding the connecting section. Adjusting means mounted to the frame means extends through such apertures to exert clamping pressure through the insulators on to the bus bars at the joint region.

Accordingly, a primary object of the instant invention is to provide a novel construction for an adjustable length bus duct unit.

Another object is to provide a novel low impedance construction of this type.

Still another object is to provide a novel construction of this type in which the relatively movable bus bars are of substantially identical cross-sectional configuration and are substantially uniform throughout the lengths thereof.

A further object is to provide a device of this type in which contact pressure at the adjusting joint is achieved by means that isolates the duct housing from reaction forces accompanying those forces provided for achieving the requisite electrical contact pressure.

A still further object is to provide an adjustable bus duct unit in which there are telescoping sections at each end of the housing constructed to provide mechanical stability.

These as well as other objects of this invention will become readily apparent after reading the following description of the accompanying drawings in which:

FIGURE 1 is a plan view illustrating a fragmentary portion of a bus duct run including an adjustable length unit constructed in accordance with the teachings of the instant invention.

FIGURES 2 and 3 are side elevations of an adjustable length unit constructed in accordance with the teachings of the instant invention and having the near housing wall removed to reveal the internal elements. In FIGURE 2 the unit is shown adjusted to its shortest length, while in FIGURE 3 the unit is shown adjusted to its longest length.

FIGURE 4 is an enlarged view of the elements of FIGURE 2.

FIGURES 5 and 6 are cross-sections of the duct housing taken through lines 5—5 and 6—6, respectively, of FIGURE 4 looking in the directions of the respective arrows 5—5 and 6—6.

FIGURE 7 is an exploded perspective showing selected elements of the adjustable length unit in the region of the sliding joint.

FIGURE 7A is a fragmentary perspective showing the main elements of FIGURE 7 in assembled relationship.

FIGURE 8 is a plan view of a rail assembly.

FIGURE 8A is a side elevation of the rail assembly of FIGURE 8 looking in the direction of arrows 8A—8A.

FIGURE 9 is a side elevation of a rail support assembly.

FIGURE 9A and FIGURE 9B are end view of the rail support assembly of FIGURE 9 looking in the directions of the respective arrows 9A—9A and 9B—9B.

FIGURE 10 is a fragmentary cross-section showing the engagement between the insulator stack and the screw for adjustment of the electrical contact clamping pressure at the sliding joint between the section of the adjustable length bus duct unit.

Now referring to the figures. Straight bus duct run 12 includes a plurality of fixed length sections 11, 11, etc. and a single adjustable length unit 10 positioned at a point intermediate the ends of run 12. The plurality of sections 11 and unit 10 are joined end to end with mechanical connecitons being effected by splice plates 13 and screws 14 while electrical connections between the bus bars at each joint are obtained by clamping means including bolt 15, of a type illustrated in detail in the Davis et al. pending U.S. Patent application Ser. No. 434,573 filed Feb. 23, 1965 for a Bus Duct With Removable Joint Stack, now U.S. Patent No. 3,339,009, issued Aug. 29, 1967, and assigned to the assignee of the instant invention.

As best seen in FIGURE 7, adjustable length unit 10 includes front seciton 20, rear section 25 and a clamping frame consisitng of top and bottom channels 21, 22 spacing tension resisting studs 23 passing through clearance apertures near the ends of both channels 21 and 22, nuts 24 threadably engaging studs 23 to hold channel 22 in operative position, and clamping screw 26 threadably mounted to channel 21 at the center thereof.

The forward portion of front section 20 is provided with generally rectangular housing 27 having eight bus bars extending therethrough in a ladder type low impedance configuration known to the art. In particular, bus bars A, A' are connected to one phase of a three phase source, bus bars B, B' are connected to a second phase of the three phase source, bus bars C and C' are connected to the third phase of the three phase source and bus bars N, N' are connected to neutral. Except at the joint regions, bus bars A and C' are in close proximity, bus bars A' and B are in close proximity and bus bars B' and C are in close proximity. Similarly, the rear of rear seciton 25 is provided with generally rectangular housing having eight flat bus bars extending therethrough in the same manner as the bus bars of the front section 20. Each bus bar of rear section 25 has been assigned a reference letter corresponding to that of the bus bar it engages in front section 20.

As best seen in FIGURES 2 and 3 the bus bars of adjustable length unit 10 are covered with insulation at the portions intermediate the ends thereof and are insulation free only at the ends thereof in order to permit electrical connections to be made. It is noted that extensive forward portions of the rear section 25 bus bars are bare of insulation to maintain electrical contact with the bus bars of front section 20 over an extended range of adjustment.

The bus bars within rear section 25 are maintained in spaced parallel relationship by two sets of insulators 31a, 31b which engage the edges of the bus bars at insulation covered portions and are clamped together by screws 99 and nuts 99a. The bus bars of front section 20 are maintained in spaced parallel relationship at their forward ends by another set of insulators 31a, 31b, screws 99 and nuts 99a. The rear ends of the bus bars of front section 20 are maintained in proper relationship by a stack of insulators 32a, 32b, 32c, 32d, 32e, 32f (FIGURE 4). The longitudinal position of insulator 32b at the rear end of bus bar N is maintained by downward protrusions 33a, 33b of insulator 32b. Cooperation of protrusion 32a with the rear end of bus bar N prevents forward movement of insulator 32b while cooperation of protrusion 33b with notch 33c in bus bar N prevents rearward movement of insulator 32b. Downward protrusions 33d along both longitudinal edges of insulator 32b cooperate with the edges of bus bar N to prevent transverse movement of insulator 32b. In a similar manner, the longitudinal and transverse positions of insulators 32a, 32c, 32d, 32e, 32f are maintained at the rear ends of the bus bars of front section 20.

As seen in FIGURE 5, housing 28 of rear section 25 includes spaced parallel side walls 41, 42 connected by screws 98 to top and bottom walls 43, 44, respectively. As seen in FIGURE 6, housing 27 of front seciton 20 includes spaced parallel side walls 45, 46 connected by screws 65 to top and bottom walls 47, 48, respectively. As seen most clearly in FIGURE 7 rail assemblies 57, 58 extend rearward from top and bottom walls 47, 48, respectively, while rail support assemblies 51, 52 extend forward from side walls 41, 42, respectively.

Since rail assemblies 57, 58 are of identical construction only rail assembly 57 will be described in detail with particular reference to FIGS. 8 and 8A. Rail assembly 57 includes spaced parallel side rails 61, 62 each having an inwardly turned portion 61a, 62a, respectively, along its upper edge at the rear thereof. Connecting plate 63, welded to sections 61a, 62a, maintains rails 61, 62 spaced apart by substantially the inside width dimension of the duct housing. As will hereinafter be seen, upwardly turned lip 63a at the forward edge of plate 63 provides lateral positioning for clamping frame channel 21. The upper edges of rails 61, 62 immediately to the rear of lip 63a are notched and inwardly turned at 61b, 62b, respectively, and, as will hereinafter be explained, portions 61b, 62b, act as stops to prevent sections 20, 25 of adjustable unit 10 from separating. At the rear of rails 61, 62 the lower edges thereof are notched and inwardly turned at 61c, 62c to form tabs which extend into recesses (not shown) in insulators 31a, 31b of front section 20. For longitudinal positioning of these insulators tapped holes 64 along the upper edges of rails 61, 62 receive screws 65 which secure rail assemblies 57, 58 and housing walls 45, 46, 47, 48 in their operative positions. It is noted that with rail assembly 57 in operative position there is a window 97 (FIGURE 7A) between rail portions 61b, 62b.

Since both of the rail support assemblies 51, 52 are identical only assembly 51 will be described with particular reference to FIGURES 9, 9A and 9B. Assembly 51 includes elongated plate 71 having its rear portion welded to the inner surface of housing side wall 41. The longitudinal edges of plate 71 are inwardly offset at 72, 73 so as to cooperate with side wall 41 to form recesses 72a, 73a which receive and guide rails 61, 62. Each of the offsets 72, 73 is provided with two inward projections 74 which extend into pockets (not shown) of the insulators 31a, 31b of rear section 25 for longitudinal positioning of such insulators. Inwardly projecting stop ears 75 are secured to offsets 72, 73 at the forward ends thereof and are positioned to cooperate with inward projections 61c, 62c of side rail assemblies 57, 58 to limit movement of rear section 25 to the fully extended position shown in FIGURE 3.

In FIGURE 4 it is seen that the forward ends of bus bars N', N of section 25 are sandwiched between the flared ends of bus bars N, N' of section 20 and that all of the neutral bus bars are sandwiched between insulators 32a and 32b. It is further seen that bus bar C of section 25 engages bus bar C of section 20 from below and that both of the bus bars C are sandwiched between insulators 32b and 32c. The B phase bus bars of section 25 are sandwiched between the B phase bus bars of section 20 with all of the B phase bus bars being sandwiched between insulators 32c and 32d. The A phase bus bars of section 25 are sandwiched between the A phase bus bars of section 20 with all of the A phase bus bars being sandwiched between insulators 32d and 32e. Bus bar C' of section 25 engages the upper surface of bus bar C' of section 20 with both of the bus bars C' being sandwiched between insulators 32e and 32f.

With channel 21 covering window 97, screw 26, threadably mounted to channel 21 of the clamping frame, extends downwardly into central depression 79 (FIGURE 10) in the upper surface of insulator 32f to provide transverse location for clamping frame. Similarly, cylindrical extension 22a (FIGURE 7) extends upwardly from clamping frame channel 22 and is received by a central locating depression (not shown) in the bottom surface of the lowest insulator 32a. Contact pressure between the bus bars of sections 20, 25 is adjusted by operation of screw 26. That is, when screw 26 is moved downward with respect to FIGURE 10 pressure on insulation stack 32a–32f increases and contact pressure increases while clamping frame studs 23, 23 are placed in tension. Naturally, in order to permit adjustment in length of unit 10, contact pressure must be relaxed to permit the bus bars of rear section 25 to slide relative to the bus bars of front section 20.

It is noted that in the joint region between sections 20 and 25 the bus bars are totally enclosed through the cooperation of plates 63, 63 of rail assemblies 57, 58 and plates 71, 71 of rail support assemblies 51, 52.

It should now be apparent to those skilled in the art that by using the concepts of the invention hereinbefore described adjustable length bus duct units may be constructed with a greater or lesser number of bus bars than illustrated in the figures. Further, these concepts may be used to construct adjustable length bus duct units having more than one stack of bus bars. Separate adjusting screws on a single clamping frame may be provided so that each bus bar stack may have its bus bar contact pressure adjusted separately. Further, additional contact pressure and/or more even distribution of contact pressure may be achieved by utilizing additional insulator stacks with additional clamping frames.

What we claim is:

1. An adjustable length bus duct unit including first and second elongated sections in axial alignment and connected mechanically and electrically for limited relative longitudinal movement; said first and second sections including elongated first and second housings, respectively, first and second sets of longitudinally extending bus bars disposed within said first and second housings, respectively, and first and second insulating means disposed within said first and second housings, respectively; said first and second insulating means positioning said first and said second sets of bus bars, respectively; a connecting means joining a first end of said first housing to a second end of said second housing; said connecting means including first and second cooperatively engaged relatively slidable portions, said first portion fixed to said first housing and slidably entered into said second end of said second housing; said second portion fixed to said second housing and slidably entered into said first end of said first housing; each of the bus bars of said first set having an exposed outer surface portion in slidable contact with an exposed outer surface portion of a corresponding one of the bus bars of said second set; an insulator stack including a plurality of insulating members interposed between and thereby spacing adjacent ones of those of said bus bars not in slidable contact; clamping means including adjustable means exerting force through said insulator stack urging those of said bus bars in slidable contact into firm electrical engagement; said housings and said connecting means in combination constituting an elongated open ended enclosure; said clamping means including frame means to which said adjustable means is mounted; said frame means surrounding said housing and being in floating relationship therewith so that reaction forces resulting from said force exerted by said adjustable means through said insulator stack do not act on said housing.

2. A bus duct unit as set forth in claim 1 in which all of said bus bars are of substantially identical cross-sections which are substantally uniform throughout the lengths thereof.

3. A bus duct unit as set forth in claim 1 in which said connecting means is provided with an opening in fixed position relative to said first housing; means maintaining said insulator stack in fixed longitudinal position relative to said first housing in alignment with said opening; said adjustable means extending from said frame means through said opening to engage said insulator stack.

4. A bus duct unit as set forth in claim 3 in which said frame means constitutes a closure for said opening.

5. A bus duct unit as set forth in claim 1 in which the bus bars of each of said sets are mounted and constructed with substantial portions intermediate the ends thereof in a low reactance paired phase ladder type configuration including said bus bars arranged in first, second and third pairs with said second pair disposed between said first and said third pairs the bus bars in each of said pairs having a much closer spacing than the spacing between adjacent ones of said pairs; for said second section said bus bars of each of said pairs flared outward at said second end with one of the bus bars of said second pair directly engaging one of the bus bars of said first pair and the other of said bus bars of said second pair directly engaging one of the bus bars of said third pair; for said first section said bus bars of each of said pairs flared outward at said first end but to a lesser extent than the bus bars of said pairs of said second section; said one bus bars of said first and said second pairs in said second section engaged by and sandwiched between one of the bus bars of said first and said second pairs of said first section; said other bus bar of second pair and said one bus bar of said third pair in said second section engaged by and sandwiched between the other bus bar of said second pair in said first section and one of the bus bars of said third pair in said first section.

6. A bus duct unit as set forth in claim 5 in which for said first section the first ends of the bus bars of each of said pairs engage opposite surfaces of individual ones of said insulating members.

7. A bus duct unit as set forth in claim 6 in which the insulating members and said first set of bus bars include cooperating formations maintaining said insulating members in fixed position relative to said first housing.

8. A bus duct unit as set forth in claim 1 in which each of said housings is of generally rectangular cross-section having first and second opposed walls spaced from each other by third and fourth opposed walls; said first portion of said connecting means including parts constituting extensions of said first and second walls of said first housing; said second portion of said connecting means including parts constituting extensions of said third and fourth walls of said second housing; said parts of said first section having longitudinally extending marginal portions projecting generally parallel and in close proximity to said third and fourth walls; said parts of said second section having longitudinally portions generally parallel to said third and fourth walls and inboard of said marginal portions in juxtaposition therewith.

9. A bus duct unit as set forth in claim 8 in which said parts of said first section each having an aperture in portions generally parallel to said first and second walls; each of said apertures fixed in position relative to said first housing; means maintaining said insulator stack in fixed longitudinal position relative to said first housing in alignment with said opening; said adjustable means extending from said frame means through a first of said apertures to engage said insulator stack; said enclosure being of substantially uniform outer cross-sectional dimensions throughout the length thereof.

10. A bus duct unit as set forth in claim 1, also including positioning formations for maintaining said insulator stack and said clamping means in longitudinally fixed positions relative to one of said first and second sets of bus bars during relative sliding movement between the bus bars of said first and said second sets of bus bars.

References Cited

UNITED STATES PATENTS

| | | |
|---|---|---|
| 2,906,811 | 9/1959 | Fisher. |
| 2,913,513 | 11/1959 | Dyer et al. |
| 3,031,521 | 4/1962 | Krauss et al. |
| 3,095,469 | 6/1963 | Cataldo. |
| 3,339,009 | 8/1967 | Davis et al. |

DARRELL L. CLAY, Primary Examiner

U.S. Cl. X.R.

174—68, 99